March 14, 1939.  H. B. THOMAS  2,150,194
SELF-LOCKING NUT
Filed July 24, 1934
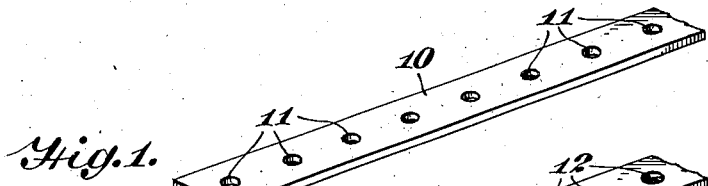
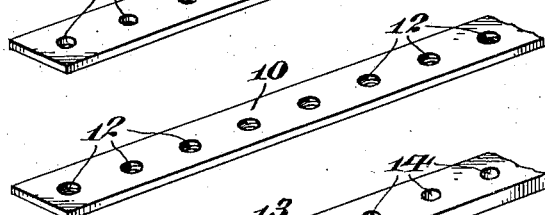
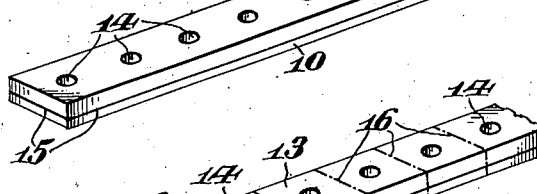
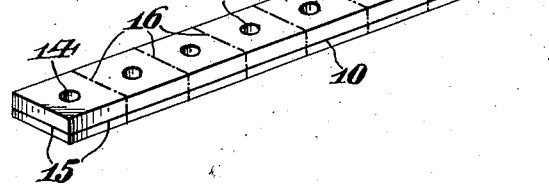
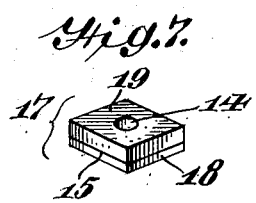
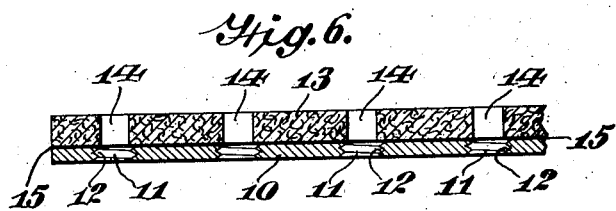
INVENTOR.
Harold B. Thomas,
BY
ATTORNEY.

Patented Mar. 14, 1939

2,150,194

UNITED STATES PATENT OFFICE 2,150,194

SELF-LOCKING NUT

Harold B. Thomas, Bloomfield, N. J., assignor to Elastic Stop Nut Corporation, a corporation of New Jersey Application July 24, 1934, Serial No. 736,648

5 Claims. (Cl. 151—7)

The invention relates to self-locking nuts and a method of making the same, and involves an improvement in self-locking nuts of the type in which a metal base portion provided with a threaded opening is held against rotation with respect to a cooperating threaded bolt, when assembled thereon, by means of a sheet of vulcanized fiber or the like secured thereto and having an unthreaded opening therethrough which registers with the threaded opening in the base portion.

The usual practice heretofore followed in making self-locking nuts of this general type has been to provide the metal body portion or base of the nut with a recess within which to secure the locking element, or to provide some other special construction for the metal base by means of which the base and the locking element are rigidly secured together.

One of the principal objects of the present invention is the provision of a self-locking nut in which no special means is provided on the metal base portion for securing the locking element thereto. Another object of the invention is the provision of a self-locking nut in which the means for securing the base and locking element together is confined entirely within the margin of the base. A further object of the invention is the provision of a self-locking nut which requires no excess of metal in the base portion in order that means may be provided for securing the locking element thereto. A still further object of the invention is the provision of a self-locking nut which may be made from blanks or sheets of material the faces and edges of which are smooth and unobstructed throughout their extent. It is also an object of the invention to provide a self-locking nut in which the locking element may be easily and cheaply secured to the base or body portion. The invention has for a still further object the provision of a self-locking nut which does not differ essentially in appearance from a nut of the non-locking type. It is also an object of the invention to provide a simple and efficient method for making a self-locking nut of the character heretofore referred to.

Still further objects and advantages of the invention will be apparent from the following description, taken with the accompanying drawing wherein:

Fig. 1 is a perspective view of a strip of perforated sheet metal from which the base or body portion of the nuts may be made;

Fig. 2 is a similar view of the metal strip after the perforations therein have been tapped;

Fig. 3 is a perspective view of a strip of perforated material from which the locking elements of the nuts are formed, the perforations being spaced to aline with the tapped perforations in the strip of sheet metal;

Fig. 4 is a perspective view showing the strips of sheet metal and locking material after being united or bonded together in face to face relation with the respective openings in registry;

Fig. 5 is a perspective view illustrating the manner in which the combined strips are severed to form individual nuts;

Fig. 6 is a longitudinal sectional view through the combined strips shown in Fig. 4; and Fig. 7 is a perspective view of an individual nut made in accordance with the present invention.

In making a nut of the form shown in Fig. 7 of the drawing a strip 10 of suitable metal is provided with a line of perforations 11 extending lengthwise thereof and preferably formed therein by a gang punching operation. These perforations are then threaded as shown at 12 in Fig. 2 of the drawing, preferably by a gang tapping operation.

A strip of material 13 suitable for forming the locking elements for the nuts, such as vulcanized fiber or other non-metallic substance having similar elastic properties, is then provided with a line of perforations 14 as illustrated in Fig. 3, these perforations being spaced to accord with the spacing of the threaded openings in the metal strip 10. The diameter of the perforations 14 in the fiber strip 13 is preferably slightly less than the diameter of the threaded perforations in the metal strip 10 for reasons which are well understood by those skilled in this art.

The strip of vulcanized fiber is then secured to the strip of sheet metal, with the respective openings in registry, by means of a suitable adhesive or bonding medium 15 applied to one or both opposing faces of the strips. When the two strips have been secured together in this manner, the combined strips may be severed transversely between alined openings, as indicated at 16, by means of a punching operation to thereby form individual nuts 17, each of which comprises a metal base 18 and a locking element 19 having substantially the same marginal contour and area. It will be understood, however, that the finished nut need not be of the square type, but may be of any other form desired, such as round or hexagonal.

When self-locking nuts are formed in this manner they have the general appearance of nuts of the non-locking type, and it will be apparent that it is unnecessary to provide any special means on the metal base 18 for securing the fiber locking element 19 thereto. Inasmuch as the diameter of the opening in the locking element 19 is slightly smaller than the diameter of the registering opening in the metal base 18, and consequently smaller than the diameter of the bolt with which the nut is used, the locking element resists the passage of the bolt therethrough and forces one side of the threads of the base into tight frictional engagement with the cooperating side of the threads of the bolt, while the material of the locking element forms a tight fit with the opposite sides of the threads of the bolt. The pressure thus exerted between the threads of the bolt and the base portion and between the threads of the bolt and the locking element retains or locks the nut in any position into which it may be turned on the bolt.

While the invention has been described in connection with a self-locking nut the base of which is formed of sheet metal and the locking element of which is made of vulcanized fiber, it will be understood that it is not to be limited in this manner, but that other materials may be employed without departing from the invention as defined by the appended claims.

Having thus described my invention, what I desire to secure by United States Letters Patent is:

1. A self-locking nut comprising a metal base having a tapped opening extending therethrough providing metal threads adapted to engage a threaded member entering the base of the nut, a sheet of non-metallic elastic material superposed upon said metal base and having an untapped opening sufficiently smaller than the maximum diameter of the thread of said tapped opening to be unsuited for the entry into the untapped opening from the top of the nut of a thread of the proper size to cooperate with the tapped opening, said tapped and untapped openings being in registry, and bonding means between said metal base and said sheet for permanently securing the same together, said sheet having a marginal contour including face portions substantially registering with face portions of said base, whereby to permit like application of turning force to both said base and said strip upon application of a wrench to the nut.

2. A self-locking nut comprising a metal base having a tapped opening extending therethrough providing metal threads adapted to engage a threaded member entering the base of the nut, a sheet of non-metallic elastic material superposed upon said metal base and having an untapped opening sufficiently smaller than the maximum diameter of the thread of said tapped opening to be unsuited for the entry into the untapped opening from the top of the nut of a thread of the proper size to cooperate with the tapped opening, said tapped and untapped openings being in registry, and bonding means between said metal base and said sheet for permanently securing the same together, said sheet having a marginal contour including face portions substantially registering with face portions of said base, whereby to permit like application of turning force to both said base and said strip upon application of a wrench to the nut, and the combined thickness of said base and said sheet being of the same order as the height of a standard metallic nut of the same thread size.

3. A self-locking nut having a base portion comprising a plane sheet of metal having a tapped opening extending therethrough providing metal threads adapted to engage a threaded member entering the base of the nut, a top portion comprising a plane sheet of non-metallic elastic material superposed upon said metal base and having an untapped opening sufficiently smaller than the maximum diameter of the thread of said tapped opening to be unsuited for the entry into the untapped opening from the top of the nut of a thread of the proper size to cooperate with the tapped opening, said tapped and untapped openings being in registry, and adhesive bonding means between said sheets for permanently securing the same together, said sheet of elastic material having a marginal contour including face portions substantially registering with face portions of said sheet of metal, whereby to permit like application of turning force to both of said sheets upon application of a wrench to the nut.

4. A self-locking nut comprising a metal base having a tapped opening extending therethrough providing metal threads adapted to engage a threaded member entering the base of the nut, a sheet of vulcanized fibre superposed upon said metal base and having an untapped opening sufficiently smaller than the maximum diameter of the thread of said tapped opening to be unsuited for the entry into the untapped opening from the top of the nut of a thread of the proper size to cooperate with the tapped opening, said tapped and untapped openings being in registry, said sheet having a marginal contour including face portions substantially registering with face portions of said base, whereby to permit like application of turning force to both said base and said strip upon application of a wrench to the nut, and means situated inwardly of the margin of said sheet for permanently securing said sheet and said base together.

5. A structure adapted to provide a plurality of self-locking nuts comprising a metal base strip having a line of spaced tapped openings extending therethrough providing metal threads in each of said openings, each adapted to engage a threaded member entering from the base of the structure, a strip of vulcanized fibre superposed on said metal base strip, and bonding means between said strips for permanently securing the strips together, said strip of fibre having a line of spaced untapped openings registering with the tapped openings and sufficiently smaller in diameter than the maximum diameters of the threads of said tapped openings to be unsuited for the entry into the untapped openings from the top of the structure of threads of the proper size to cooperate with the tapped openings, said strips having substantially the same width and the spacing between the holes in the strips being such as to permit the strips to be severed between adjacent holes to form substantially square nuts.

HAROLD B. THOMAS.